US012159503B2

(12) United States Patent
Wurmfeld et al.

(10) Patent No.: US 12,159,503 B2
(45) Date of Patent: *Dec. 3, 2024

(54) FINANCIAL ARTICLE PROCESSING DEVICES AND METHODS

(71) Applicant: Capital One Services, LLC, McLean, VA (US)

(72) Inventors: David Kelly Wurmfeld, Fairfax, VA (US); Michael Kidd, Litchfield, NH (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,656

(22) Filed: Jun. 23, 2023

(65) Prior Publication Data

US 2023/0334931 A1 Oct. 19, 2023

Related U.S. Application Data

(63) Continuation of application No. 17/511,929, filed on Oct. 27, 2021, now Pat. No. 11,721,155.

(51) Int. Cl.

*G07D 11/235* (2019.01)
*G07D 1/00* (2006.01)

(Continued)

(52) U.S. Cl.

CPC ............. *G07D 11/235* (2019.01); *G07D 1/00* (2013.01); *G07D 11/12* (2019.01); *G07D 11/40* (2019.01);

(Continued)

(58) Field of Classification Search

CPC ........ G07D 11/235; G07D 1/00; G07D 11/12; G07D 11/40; G07D 2201/00; G07D 2211/00; G07D 11/13; G07F 19/205

See application file for complete search history.

(56) References Cited

U.S. PATENT DOCUMENTS 5,984,509 A 11/1999 Lowell
6,626,426 B2 9/2003 Swinton et al.

(Continued)

FOREIGN PATENT DOCUMENTS

CN 207068107 U 3/2018
EP 3825970 A1 5/2021

OTHER PUBLICATIONS

Shin, Xin-Yu (CN 202177940U), Rotating structure cash dispenser, Mar. 28, 2012 (Year: 2022).

(Continued)

*Primary Examiner* — Tuyen K Vo
(74) *Attorney, Agent, or Firm* — TROUTMAN PEPPER HAMILTON SANDERS LLP; Christopher J. Forstner; John A. Morrissett

(57) ABSTRACT

Disclosed herein are financial article handling devices comprising an external aperture connected to a rotary table. The rotary table can contain two or more financial article handling units disposed on the rotary table, each of which can be configured to form an interface with the external aperture. The financial article handling devices can receive an indication from a first financial article handling unit that the first financial article handling unit is no longer functional, disconnect the first financial article handling unit from the external aperture, and articulate the rotary table such that a second financial article handling unit is in communication with the external aperture.

20 Claims, 4 Drawing Sheets

(51) Int. Cl.
*G07D 11/12* (2019.01)
*G07D 11/40* (2019.01)

(52) U.S. Cl.
CPC ..... *G07D 2201/00* (2013.01); *G07D 2211/00* (2013.01)

(56) References Cited

U.S. PATENT DOCUMENTS

| | | | |
|---|---|---|---|
| 8,600,842 | B1 | 12/2013 | Sanders et al. |
| 8,712,872 | B2 | 4/2014 | Smith et al. |
| 9,940,770 | B1 | 4/2018 | Chang et al. |
| 10,311,646 | B1 | 6/2019 | Wurmfeld et al. |
| 2007/0205259 | A1 | 9/2007 | Tocher et al. |
| 2008/0136096 | A1 | 6/2008 | Crerar |
| 2016/0364932 | A1 | 12/2016 | Hu et al. |
| 2018/0102014 | A1 | 4/2018 | Chang et al. |

OTHER PUBLICATIONS

JP-5564767B2, Aug. 6, 2014 (Year: 2022).
Extended European Search Report in related EP Application No. 22203294.8 mailed Mar. 8, 2023.

FINANCIAL ARTICLE PROCESSING DEVICES AND METHODS

CROSS-REFERENCE TO RELATED APPLICATIONS

This application is a continuation of, and claims priority under 35 U.S.C. § 120 to, U.S. patent application Ser. No. 17/511,929, filed Oct. 27, 2021, the entire contents of which are fully incorporated herein by reference.

FIELD OF THE DISCLOSURE

The present disclosure relates generally to financial article devices and methods; and particularly, to financial article handling devices and methods using an articulating a rotary table.

BACKGROUND

Automatic teller machines (ATMs) have become a ubiquitous part of everyday life. ATMs are widely used to make transactions with a variety of financial instruments because they often provide for quick, easy, and more convenient service than, for example, interaction at a bank with a teller. Currently, however, ATMs have some shortcomings that simply cannot match the level of service provided when making a transaction with an actual bank teller. For instance, the majority of transactions conducted at ATMs are to receive cash or other financial instruments (e.g., withdrawals). As such, the need is great to keep ATMs stocked to meet the demand of such transactions. Compared to a bank, the storage capacity of an ATM is low, often requiring routine service by a qualified technician.

Every time an ATM needs to be refilled and/or serviced, the downtime is costly to the customers who wish to use the ATM as well as the owners of the ATM. As such, it is desirable to minimize ATM downtime by increasing the storage capacity of an ATM. However, ATMs exist in areas where the useable footprint is low. Because most ATMs reside in public, highly trafficked areas, there is little room to expand the physical space and/or volume of ATMs. Furthermore, replacing existing in-service ATMs with newer or revised ATMs would require a large amount of capital and time investment compared to upgrading the current in-service ATMs.

What is needed, therefore, are devices and methods that can greatly expand the storage capacity of ATMs without requiring a larger volume or footprint. Embodiments of the present disclosure address this need as well as other needs that will become apparent upon reading the description below in conjunction with the drawings.

BRIEF SUMMARY OF THE INVENTION

The present disclosure relates generally to financial article devices and methods; and particularly, to financial article handling devices and methods using an articulating a rotary table.

An example of the present disclosure can provide a financial article handling device, including: a housing having a user interface; an external aperture on an external face of the housing, the external aperture connecting to an interior of the housing; a rotary table in the interior of the housing; two or more financial article handling units disposed on the rotary table, each of the two or more financial article handling units configured to form an interface with the external aperture; a processor in communication with the user interface, the external aperture, the rotary table, and the two or more financial article handling units; and a memory storing instructions to be executed by the processor.

Another example of the present disclosure can provide a financial article handling device, including: a housing; a processor contained within the housing; and a memory storing instructions that, when executed by the processor, cause the financial article handling device to: connect a first financial article handling unit to an external aperture on an external face of the housing, the first financial article handling unit being attached to a rotary table inside of the housing; receive an indication from the first financial article handling unit (e.g., the indication indicating that the first financial article handling unit is not functional); disconnect the first financial article handling unit from the external aperture; articulate the rotary table such that a second financial article handling unit is in communication with the external aperture; and connect the second financial article handling unit to the external aperture.

Another example of the present disclosure can provide a method of operating a financial article handling device, the method including: connecting a first financial article handling unit to an external aperture on an external face of the financial article handling device, the first financial article handling unit attached to a rotary table inside the financial article handling device; receiving an indication from the first financial article handling unit (e.g., the indication indicating that the first financial article handling unit is not functional); disconnecting the first financial article handling unit from the external aperture; rotating the rotary table such that a second financial article handling unit is in communication with the external aperture; and connecting the second financial article handling unit to the external aperture.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
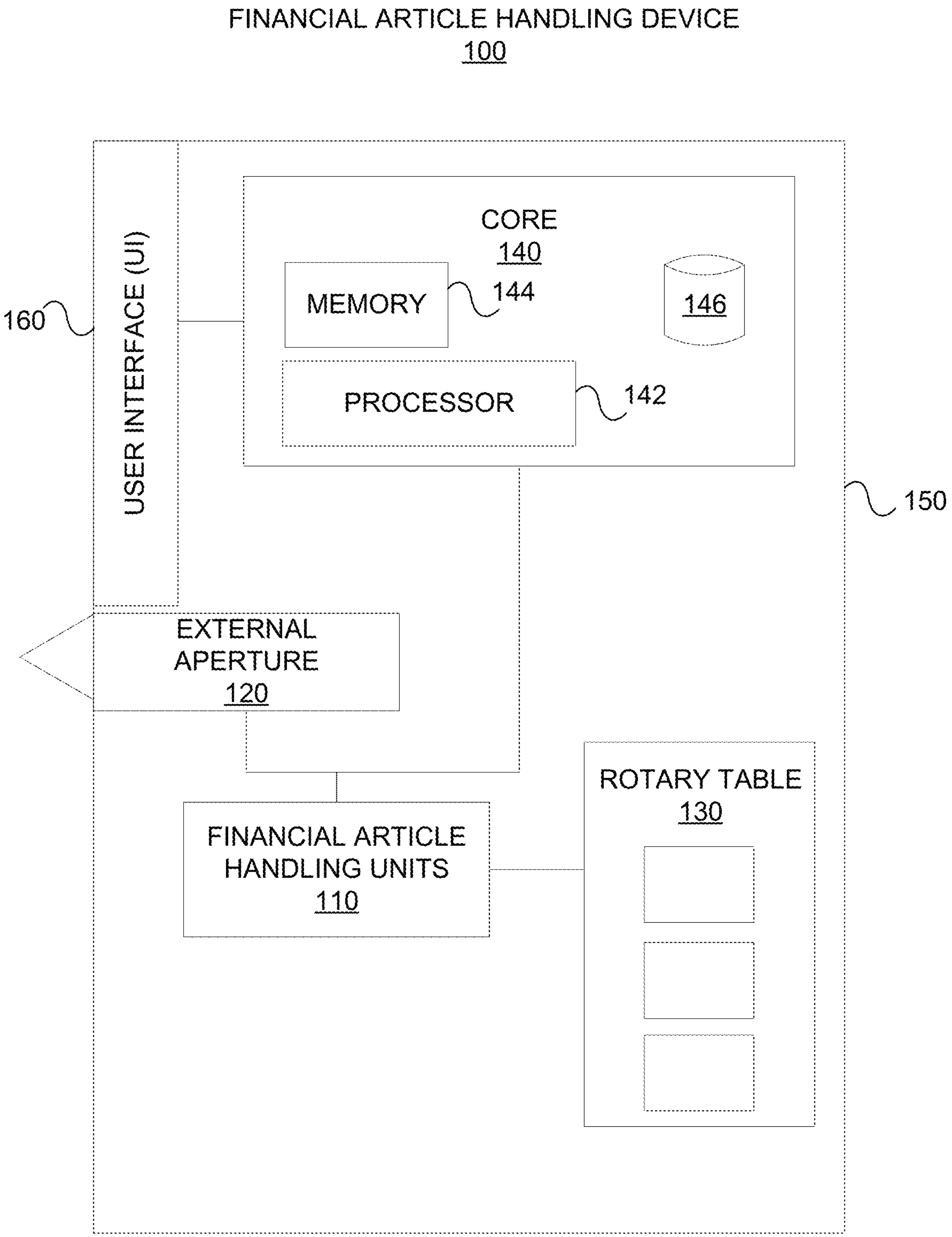
FIG. 1 is a system diagram of a financial article handling device in accordance with some examples of the present disclosure.

As described above, a problem with current ATMs is that the supply and storage volume within ATMs is limited. As such, ATMs required more downtime to refill and keep the ATMs operational, reducing the convenience that ATMs provide compared to bank tellers. Additionally, currently in-service ATMs have limited footprint, meaning upgrading existing ATMs has a large associated monetary and time cost. As such, it is desirable to maximize the storage space of in-service ATMs, thus extending uptime, while operating within the existing footprint in public spaces.

Therefore, examples of the present disclosure can include financial article processing devices and methods for handling financial articles (e.g., an ATM, automated checkout counter, vending machine, etc.). When in use, the financial article processing devices can be configured to dispense or otherwise handle financial articles through an external aperture. The external aperture (e.g., shutter) can be connected to an internal financial article handling unit. The internal financial article handling unit can be disposed on an internal rotary table with additional financial article handling units. When the first financial article handling unit is nonfunctional (e.g., empty, full, mechanical fault), the rotary table can disconnect it from the external aperture and articulate such that a second financial article handling unit can be connected to the external aperture. Then, the second financial article handling unit can be connected to the external aperture.

For ease of explanation, the systems and methods described herein are described with respect to an ATM. One of skill in the art will recognize, however, that the disclosure is not so limited and that the systems and methods could also be used on other applications. Instead of ATM, the system could be used in conjunction with, for example, self-checkout at grocery, and other, stores, vending machines of all sorts, currency exchange, ticket sales, etc. These, and other applications, are contemplated herein.

In addition, although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

The present disclosure can include a financial article processing device. The device can include a housing with a user interface and an external aperture on an external face of the housing. The housing can define an interior volume. In the interior volume, the device can comprise a rotary table. Two or more (e.g., three or more, four or more, five or more, six or more, seven or more, eight or more, nine or more, or ten or more) financial article handling units can be disposed on or otherwise attached to the rotary table. Each of the two or more financial article handling units can be configured to form an interface with the external aperture.

The device can further comprise a processor in communication with the user interface, the external aperture, the rotary table, and the two or more financial article handling units, and a memory storing instructions to be executed by the processor. The instructions, when executed by the processor, can cause the financial article handling device to receive an indication from a first financial article handling unit of the two or more financial article handling units, the indication indicating that the first financial article handling unit is no longer functional (e.g., mechanical fault, jammed, empty, full, etc.). In response, the instructions can cause the processor to disconnect the first financial article handling unit from the external aperture. Then, the processor can articulate the rotary table such that a second financial article handling unit of the two or more financial article handling units is in communication with the external aperture.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

As shown in FIG. 1 the financial article handling device 100 can comprise one or more financial article handling units 110. An example of a financial article handling unit 110 is shown in greater detail in FIG. 3. As shown, the financial article handling units can be connected to the external aperture. The external aperture 120 can be on an external face of the housing 150. The external aperture 120 can provide a passageway from the external face of the housing 150 into an interior volume defined by the housing 150.

Furthermore, the financial article handling units 110 can be disposed on a rotary table 130. An example of a rotary table is shown in greater detail in FIG. 2.

As shown, the external aperture 120 can be at least partially contained on a front area of the housing 150 and at least partially contained within the housing 150. The external aperture can receive one or more articles (i.e., from a customer) and pull the one or more articles into the interior of the housing 150 and the financial article handling device 100. As such, the external aperture 120 can comprise a shutter (or other such security device) such that the interior of the housing 150 is inaccessible from the external face of the housing 150. The external aperture 120 can be in mechanical communication with a financial article handling unit 110 and can transfer the one or more articles to the financial article handling unit 110 to be processed. The financial article handling unit 110 can process the one or more articles and be in mechanical communication and/or disposed on the rotary table 130.

The financial article handling units 110 can also include various inlets and outlets to provide mechanical communication with other components of financial article handling device 100. During a transaction, for instance, the financial article handling device 100 can transfer one or more articles from the external aperture 120 (where the one or more articles are received from the customer) to the financial article handling units 110.

A transaction can be initiated on the financial article handling device 100 by a customer initiating the transaction at a UI 160 (i.e., on a touch screen, a keypad, or a microphone). The transaction, for instance, can be a withdrawal, a deposit, an account balance check, and the like. Messages can be delivered to the customer via the UI 160 or a speaker to aid in progressing the transaction. Messages can be created by the core 140 or stored in the core 140 (e.g., in the storage device 146). In some examples, the core 140 can communicate with an account provider system to obtain information of the customer or to verify information input by the customer. For example, the financial article handling device 100 can ask the customer for other information, such as an account number, a personal identification number (PIN), a password, a transaction type, and the like. In such an embodiment, the core 140 can allow for a communication link between the financial article handling device 100 and an account provider system via a network.

The external aperture 120 can also be configured to receive one or more financial instruments, such as in the form of coins (i.e., with a coin hopper), checks (i.e., with a check receiver), or paper bills (i.e., with a bill throat). The financial article handling units 110 can also receive one or more articles from other components of the financial instrument processing device 100, such as an interior article storage unit (not shown). Additionally, the financial article handling units 110 can have the ability to transfer one or more articles out of the financial article handling units 110 (and therefore out of the rotary table 130) to other components of financial article handling device 100.

During a transaction, the customer can insert one or more paper bills (i.e., into a bill throat 152*c*) and one or more coins (i.e., into a coin hopper 152*a*) into the financial article handling device 100 after indicating the desired transaction is a cash deposit. Other financial instruments may be received by the financial article handling device 100 depending on the transaction initiated by the customer. In some examples, the external aperture 120 can comprise additional receivers for multiple types of financial instruments not shown, such as bank card slots, credit card slots, card chips, cashier's checks, money orders, treasury notes, bonds, and the like.

The financial article handling device 100 can further comprise a core 140. The core 140 can comprise a processor 142, a memory 144, and a storage device 146. The components described in the core 140 can further be in electrical communication with each other, as well as with other components of the financial article handling device 100. The electrical communication can provide the transfer of power, signals, information, or other similar communications between components.

The memory 144 can store various instructions, programs, databases, and the like, such as an operating system (OS) (e.g., windows, iOS, Linux), a program to be executed by the financial article handling unit, or a database in communication with the storage device 146. The core 140 can also provide external communication. For example, the core 140 can communicate over a network with various systems, such as a security system or an account provider system.

The connection between the core 140 and an account provider system over a network can complete a transaction. For example, after one or more articles (e.g., financial instruments) have been processed to obtain a value, and the value has been confirmed on the UI 160 by a customer, the core 140 can provide the value to the account provider system to credit the value to the account associated with the customer. The account provider system can also provide information to the financial article handling device 100, such as an account balance for the customer, a credit receipt, and the like.

Such an embodiment allows for efficient electrical and mechanical communication of all components in the financial article handling device 100. It is understood that the aforementioned examples are meant to be illustrative, and one of ordinary skill in the art would appreciate that several configurations and connections of the various components are possible and contemplated within the scope of this disclosure. Such embodiments as described above allow for efficient and improved processing of transaction and allow for financial instruments to be processed with a greater level of trust to the customer.

The core 140 can also communicate with the user interface (UI) 160, for instance, to provide a display or other graphics to a customer. The core 140 can further allow or facilitate communicate of the other components of the financial article handling device 100. For example, the core 140 can receive data and/or indications from the financial article handling units 110.

For instance, the core 140 can receive an indication from a first financial article handling unit of the financial article handling units 110. The indication can indicate that the first financial article handling unit is no longer functional. The core 140 can also receive other data from the financial article handling units 110, such as diagnostic data and/or status report data. For example, the indication that the first financial article handling unit is no longer functional can include data indicating that the first financial article handling unit is empty (e.g., in the example of a cash/article dispenser), full (e.g., in the example of a cash/article recycler) or jammed.

In response, the core 140 can disconnect the first financial article handling unit from the external aperture 120. For example, the financial article handling device 100 can further comprise a connection mechanism configured to detachably attach the financial article handling units 110 to the external aperture 120. The core 140 can disengage the connection mechanism. The financial article handling device 100 can also comprise a transfer mechanism configured to transfer articles between the financial article handling units 110 and the external aperture 120. The core 140 can further disengage the transfer mechanism while disengaging the connection mechanism. The connection mechanism and the transfer mechanism can be disengaged simultaneously or in a predetermined order.

Then, the core 140 can articulate the rotary table 130 such that a second financial article handling unit of the financial article handling units 110 is in communication with the external aperture 120. The core 140 can also re-engage the connection mechanism and the transfer mechanism to the second financial article handling unit. The rotary table 130 and the financial article handling units 110 are illustrated in greater detail in FIG. 2.

Figure 2:
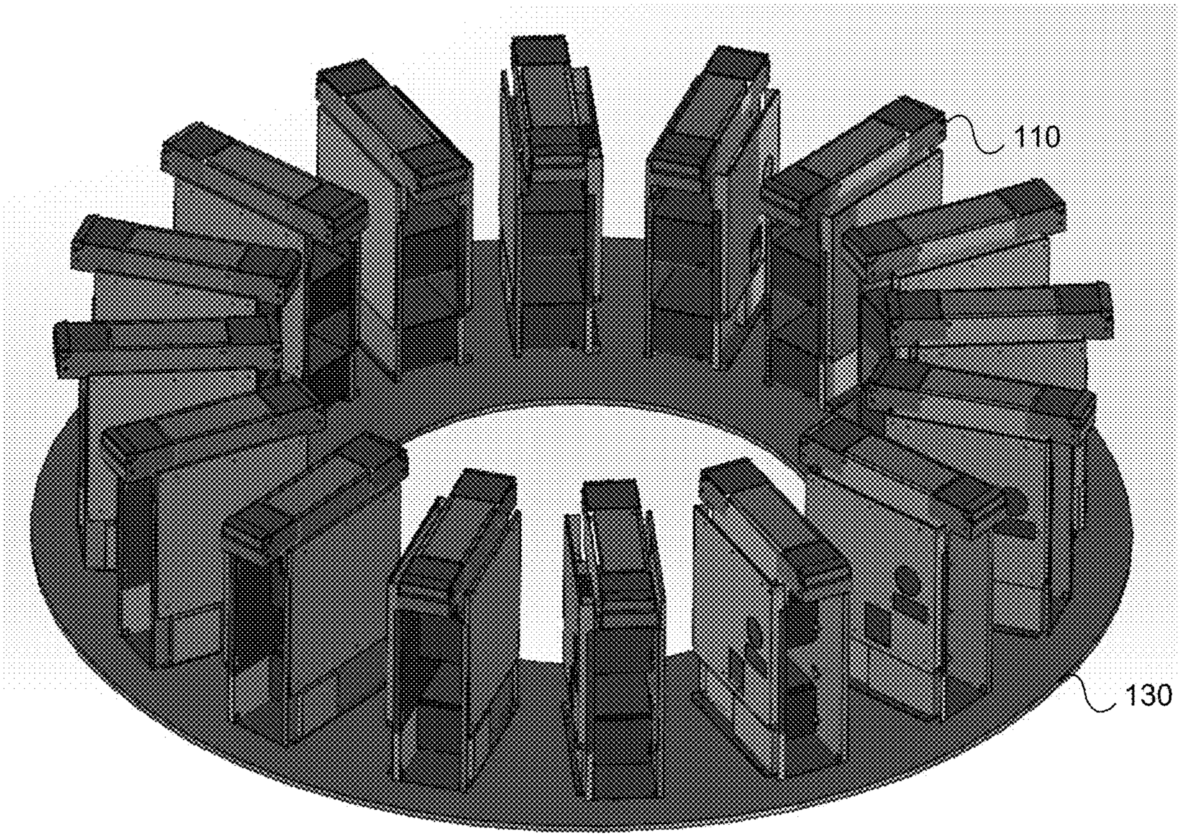
FIG. 2 illustrates a perspective view of a rotary table containing two or more financial article handling units in accordance with some examples of the present disclosure.

As shown in FIG. 2, the rotary table 130 can comprise a plurality of financial article handling units 110 disposed thereon. As shown, the rotary table 130 can be a planar platter. Although the rotary table 130 is illustrated as being circular, it is understood that the rotary table 130 can comprise any shape so long as the rotary table 130 can articulate within the interior volume of the housing 150. The rotary table 130 can allow the financial article handling device 100 to house multiple financial article handling units 110 within the interior volume of the housing 150. Therefore, the inventory or practical storage space of the financial article handling device 100 can be increased while retaining the same interior volume as defined by the housing 100.

For example, the rotary table 130 can actually be a conveyor belt with one or more financial article handling units 110 attached thereto. The conveyor belt can articulate (e.g., convey the financial article handling units 110 as desired within the interior volume of the housing 150. The financial article handling units 110 can also be attached to a belt, chain, or other driving device. Furthermore, the rotary table 130 need not be a solid platter. The financial article handling units 110 can be disposed on other rotating mechanisms.

The financial article handling units 110 can be a variety of article handlers. For instance, the financial article handling units 110 can comprise financial article dispensers, financial article recyclers, financial article storage units, and the like. Suitable examples of financial article handling units 110 can include, but are not limited to, cash dispensers, cash recyclers, coin hoppers, check storage, credit card storage, credit card shredders, check scanners, coin discriminators, and the like. Furthermore, the financial article handling units 110 can comprise any suitable financial article handler as desired by those of ordinary skill in the art so long as each financial article handler is disposed on the rotary table 130.

The financial article handling units 110 can comprise a plurality of uniform financial article handling units 110. In other words, all units of the financial article handling units 110 can be the same unit. For instance, each financial article handling unit can be a Fujitsu F56 cash dispenser disposed on the rotary table 130. Alternatively, the financial article handling units 110 can comprise a plurality of dissimilar financial article handling units 110. In other words, there can be a variety of financial article handling units disposed on the rotary table 130. For instance, the rotary table 130 can have one cash dispenser, one cash recycler, one check scanner, and one coin hopper (e.g., one Fujitsu F56, one Diebold Nixdorf RM3, and one Diebold Nixdorf RM4). The composition of the financial article handling units 110 can be changed as desired depending on efficiency and intended use by those of ordinary skill in the art.

As described above, a problem with current ATMs is that the supply and storage volume within ATMs is limited. As such, ATMs required more downtime to refill and keep the ATMs operational, reducing the convenience that ATMs provide compared to bank tellers. Additionally, currently in-service ATMs have limited footprint, meaning upgrading existing ATMs has a large associated monetary and time cost. As such, it is desirable to maximize the storage space of in-service ATMs, thus extending uptime, while operating within the existing footprint in public spaces. Therefore, the disclosed rotary table 130 can increase the capacity of the financial article handling device 100 by the inclusion of a plurality of financial article handling units 110 disposed on the rotary table 130.

The rotary table 130 can further include a series of mechanical drivers configured to articulate the rotary table 130. The series of mechanical drivers can be in communication with the core 140. For example, the series of mechanical drivers can include servos or other motors electronically coupled to the core 140 such that the core 140 can control the mechanical drivers. The mechanical drivers can also include any variations of belts, chains, gears, and the like configured to articulate the rotary table 130 when desired.

The financial article handling device 100 (and the housing 150) can be opened if a service technician or other worker wishes to service the financial article handling device 100 or other components within the housing 150. For example, a cash transporter can open the housing 150 to refill the financial article handling units 110 with cash such that the financial article handling device 100 can continue to dispense cash. In such a manner, the housing 150 can comprise various locks, pins, deadbolts, and other similar security devices to ensure that the housing 150 cannot be opened except by a qualified service technician.

As described above, the rotary table 130 and the financial article handling units 110 can have different compositions and configurations. As such, to aid a service technician in performing maintenance on the rotary table 130 and the financial article handling units 110, the financial article handling device 100 can be configured to provide (e.g., via the core 140) an augmented reality overlay to the service technician. Examples of a suitable augmented reality overlay can be found in U.S. Pat. No. 10,311,646, which is incorporated herein by references as if fully set forth in the description herein.

Figure 3:
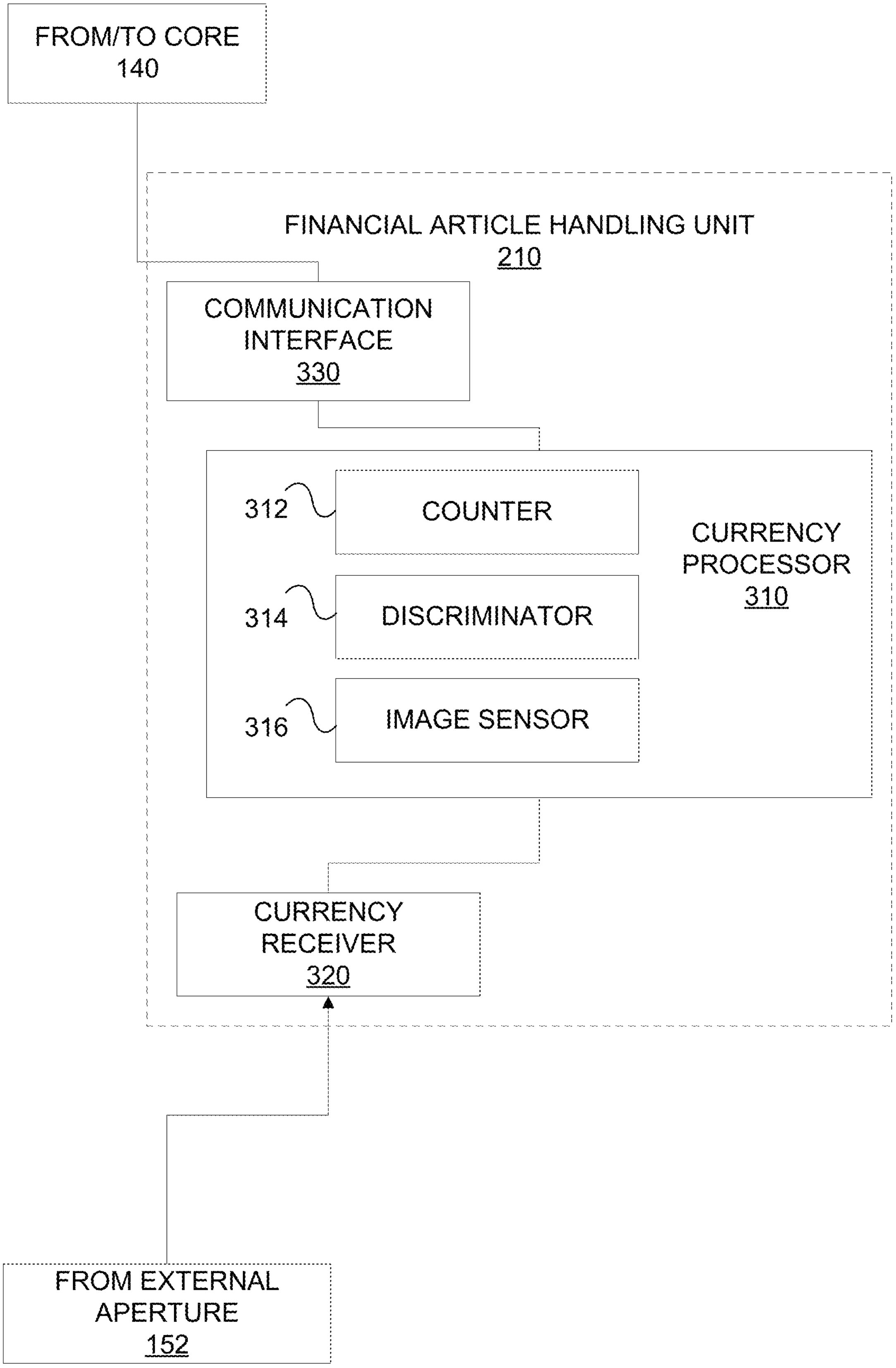
FIG. 3 illustrates a system diagram of a financial article handling unit in a financial article handling device in accordance with some examples of the present disclosure.

FIG. 3 illustrates an example of a financial article handling unit 110 for processing one or more financial articles by a customer of a financial article handling device 100. The financial article handling unit 110 can comprise a financial instrument receiver 320, a financial instrument processor 310, and a communication interface 330. The financial instrument receiver 320 can be in communication with an external aperture 120 and can receive one or more financial instruments from the external aperture 120.

The financial instrument receiver 320 can then transfer the one or more financial instruments to the financial instrument processor 310. The financial instrument processor 310 can be in mechanical communication with other components of the financial article handling device 100 and can transfer one or more financial instruments out of the financial article handling unit 110. The financial instrument processor 310 can further be in electrical communication with a communication interface 330, providing a connection with the other components of the financial article handling device 100 and allowing the financial article handling unit 110 to have electrical communication with the core 140.

The financial instrument processor 310 can comprise several components for processing one or more financial instruments as provided during a transaction. The financial instrument processor 310 can comprise, for instance, a financial instrument counter 312, a discriminator 314, an image sensor 316, and other similar processing components, such as coin sorters, check scanners, size sorters, color sensors, and the like. Other processing components can be present to effectively process one or more financial instruments. Once the processing is complete, the financial instrument processor 310 can provide information to the communication interface 330 to send the information elsewhere in the financial article handling device 100. For example, the financial instrument processor 310 can obtain a value of the one or more financial instruments and provide the value to a communication interface 330. The communication interface 330 can then send the value to the core 140 or directly to the UI 160 to display the value to the customer.

Additionally, the communication interface 330 can receive instructions or information from elsewhere in the financial article handling device 100. For instance, the communication interface 330 can receive instructions from the core 140, such as instructions to disconnect from the external aperture 120.

Figure 4:
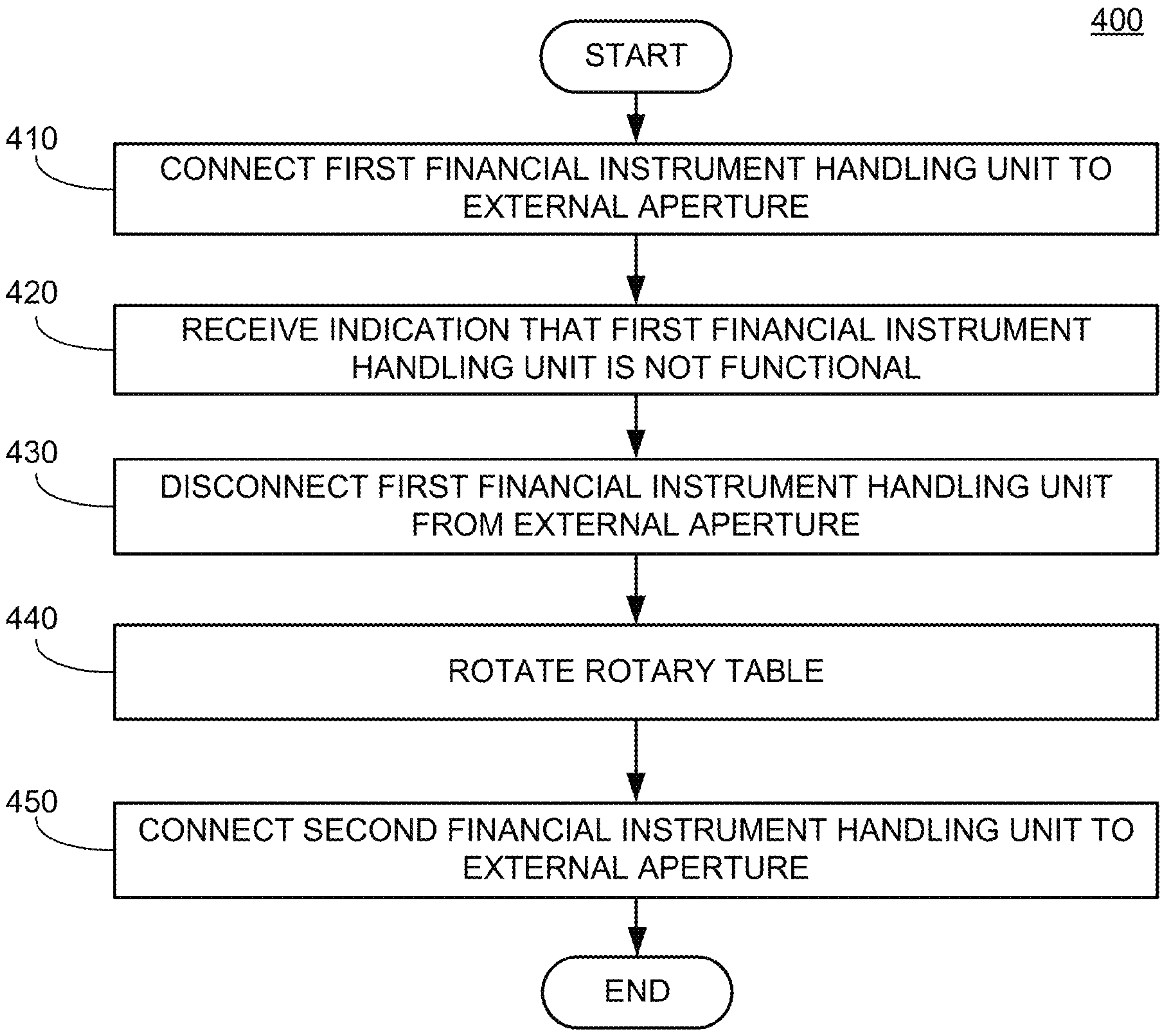
FIG. 4 illustrates a flowchart of a method of operating a financial article handling device in accordance with some examples of the present disclosure.

FIG. 4 illustrates a flowchart of an example method 400 of operating a financial article handling device 100. As shown in block 410, the core 140 can connect a first financial article handling unit to an external aperture 120 on an external face of the financial article handling device 100. The first financial article handling unit can be disposed on a rotary table 130 inside of a housing of the financial article handling device 100. The method 400 can then proceed on to block 420.

In block 420, the core 140 can receive an indication from the first financial article handling unit. The indication can indicate that the first financial article handling unit is not functional. The core 140 can also receive other data from the financial article handling units 110, such as diagnostic data and/or status report data. For example, the indication that the first financial article handling unit is no longer functional can include data indicating that the first financial article handling unit is empty (e.g., in the example of a cash/article dispenser), full (e.g., in the example of a cash/article recycler) or jammed. The method 400 can then proceed on to block 430.

In block 430, the core 140 can disconnect the first financial article handling unit from the external aperture 120. For example, the financial article handling device 100 can further comprise a connection mechanism configured to detachably attach the financial article handling units 110 to the external aperture 120. The core 140 can disengage the connection mechanism. The financial article handling device 100 can also comprise a transfer mechanism configured to transfer articles between the financial article handling units 110 and the external aperture 120. The core 140 can further disengage the transfer mechanism while disengaging the connection mechanism. The connection mechanism and the transfer mechanism can be disengaged simultaneously or in a predetermined order. The method 400 can then proceed on to block 440.

In block 440, the core 140 can rotate the rotary table 130 such that a second financial article handling unit is in communication with the external aperture 120. The core 140 can further determine which financial article handling unit of the plurality of financial article handling units 110 is fully functional/operation and designate that unit as the second financial article handling unit. The core 140 can also re-engage the connection mechanism and the transfer mechanism to the second financial article handling unit.

The rotary table 130 can further include a series of mechanical drivers configured to articulate the rotary table 130. The series of mechanical drivers can be in communication with the core 140. For example, the series of mechanical drivers can include servos or other motors electronically coupled to the core 140 such that the core 140 can control the mechanical drivers. The mechanical drivers can also include any variations of belts, chains, gears, and the like configured to articulate the rotary table 130 when desired. This series of mechanical drivers can be controlled and/or instructed by the core 140. The method 400 can then proceed on to block 450.

In block 450, the core 140 can connect the second financial article handling unit to the external aperture 120. The core 140 can also re-engage the connection mechanism and the transfer mechanism to the second financial article handling unit. The method 400 can then terminate after block 450. However, the method 400 can also proceed on to other method steps not shown.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXEMPLARY USE CASES

The following exemplary use cases describe examples of a typical user flow pattern. They are intended solely for explanatory purposes and not limitation.

A customer can initiate a transaction at a financial article handling device (e.g., an ATM). The customer can make a request to withdraw cash from an account associated with the customer. Once approved, the financial article handling device can dispense the requested financial articles (e.g., cash) to the customer. The financial articles can be dispensed from within the financial article handling device from a financial article handling unit (e.g., a cash distributor) and through an external aperture (e.g., a bill throat) from where the customer can retrieve the financial articles.

Upon completing the transaction, the financial article handling unit may be empty (e.g., all the cash in the cash distributor has been dispensed). The financial article handling unit can transmit an indication to the core of the financial article handling device indicating that, as such, the financial article handling unit is nonfunctional (e.g., empty). The core can then disconnect the financial article handling unit from the external aperture. The core can then articulate a rotary table on which the financial article handling unit resides. This articulation can move the financial article handling unit away from the external aperture. The core can continue the articulation until a second financial article handling unit (e.g., a different cash dispenser) is lined up with the external aperture. Then, the core can connect the second financial article handling unit to the external aperture such that the financial article handling device can remain in operation.

By way of another example, a customer can initiate a transaction at a financial article handling device (e.g., an ATM). The customer can make a request to deposit cash into an account associated with the customer. Once approved, the financial article handling device can receive the deposited financial articles (e.g., cash) from the customer. The financial articles can be drawn into the financial article handling device and into a financial article handling unit (e.g., a cash recycler) and through an external aperture (e.g., a bill throat) in where the customer can deposit the financial articles.

Upon completing the transaction, the financial article handling unit may be full (e.g., the cash recycler can no longer receive cash). The financial article handling unit can transmit an indication to the core of the financial article handling device indicating that, as such, the financial article handling unit is nonfunctional (e.g., full). The core can then disconnect the financial article handling unit from the external aperture. The core can then articulate a rotary table on which the financial article handling unit resides. This articulation can move the financial article handling unit away from the external aperture. The core can continue the articulation until a second financial article handling unit (e.g., a different cash recycler) is lined up with the external aperture. Then, the core can connect the second financial article handling unit to the external aperture such that the financial article handling device can remain in operation.

What is claimed is:

1. An article handling device, comprising:

a housing, comprising a user interface;

an external aperture on an external face of the housing, the external aperture connecting to an interior of the housing;

a rotary table in the interior of the housing;

a first article handling unit disposed on the rotary table and configured to form an interface with the external aperture to receive a first type of article from the external aperture;

a second article handling unit disposed on the rotary table and configured to form an interface with the external aperture to receive the first type of article from the external aperture;

a processor in communication with the user interface, the external aperture, the rotary table, and the first and the second article handling units; and a memory storing instructions to be executed by the processor; wherein the instructions, when executed by the processor, cause the article handling device to: receive an indication from the first article handling unit that the first article handling unit is no longer functional; disconnect the first article handling unit from the external aperture; and articulate the rotary table such that the second article handling is in communication with the external aperture.

2. The article handling device of claim 1, wherein the first type of article comprises paper bills, and the external aperture comprises a bill throat for receiving one or more paper bills.

3. The article handling device of claim 2, wherein the external aperture comprises a shutter such that the one or more paper bills in the interior of the housing is inaccessible from the external face of the housing.

4. The article handling device of claim 1, further comprising a connection mechanism configured to detachably attach the first and the second article handling units to the external aperture.

5. The article handling device of claim 4, further comprising a transfer mechanism configured to transfer articles between the first and the second article handling units and the external aperture.

6. The article handling device of claim 1, wherein the first article handling unit and the second article handling unit are dissimilar article handling units.

7. The article handling device of claim 1, wherein the first and the second article handling units each comprise article dispensers.

8. The article handling device of claim 1, wherein the first and the second article handling units each comprise article recyclers.

9. An article handling method, comprising:

connecting a first article handling unit to an external aperture on an external face of a housing, the first article handling unit configured to receive a first type of article and disposed on a rotary table inside the housing;

receiving an indication from the first article handling unit that the first article handling unit is not functional;

disconnecting the first article handling unit from the external aperture;

articulating the rotary table such that a second article handling unit is in communication with the external aperture, the second article handling unit configured to receive the first type of article; and connecting the second article handling unit to the external aperture.

10. The article handling method of claim 9, wherein the external aperture comprises a shutter such that the first and second article handling units are inaccessible from the external face of the housing.

11. The article handling method of claim 9, wherein the connecting comprises connecting by a connection mechanism configured to detachably attach one of the first and the second article handling units to the external aperture.

12. The article handling method of claim 11, wherein the connecting further comprises transferring one or more articles by a transfer mechanism configured to transfer articles between the first and second article handling units and the external aperture.

13. The article handling method of claim 9, wherein the rotary table further comprises a third article handling unit that is dissimilar to the first and second article handling units.

14. The article handling method of claim 9, wherein the first and second article handling units comprise article dispensers.

15. The article handling method of claim 9, wherein the first and second article handling units comprise article recyclers.

16. A method of operating an article handling device, the method comprising:

connecting a first article handling unit to an external aperture on an external face of the article handling device, the first article handling unit disposed on a rotary table inside the article handling device;

receiving an indication from the first article handling unit that the first article handling unit is not functional;

disconnecting the first article handling unit from the external aperture;

rotating the rotary table such that a second article handling unit is in communication with the external aperture; and connecting the second article handling unit to the external aperture.

17. The method of claim 16, wherein the external aperture comprises a shutter such that the first and second article handling units are inaccessible from the external face of the article handling device.

18. The method of claim 16, wherein the connecting comprises a connection mechanism configured to detachably attach one of the first and the second article handling units to the external aperture.

19. The method of claim 18, wherein the connection mechanism further comprises a transfer mechanism configured to transfer articles between the first and second article handling units and the external aperture.

20. The method of claim 16, wherein the first and the second article handling units comprise the same article handling unit.

* * * * *